United States Patent
Nimtz

(10) Patent No.: US 11,154,805 B2
(45) Date of Patent: Oct. 26, 2021

(54) FILTER INSERT AS WELL AS FLUID FILTER

(71) Applicant: MANN+HUMMEL GmbH, Ludwigsburg (DE)

(72) Inventor: Felix Nimtz, Leimen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 414 days.

(21) Appl. No.: 16/160,338

(22) Filed: Oct. 15, 2018

(65) Prior Publication Data

US 2019/0111371 A1    Apr. 18, 2019

(30) Foreign Application Priority Data

Oct. 16, 2017    (DE) .................. 10 2017 009 633.3

(51) Int. Cl.
| | |
|---|---|
| *B01D 46/00* | (2006.01) |
| *B01D 39/12* | (2006.01) |
| *B01D 39/10* | (2006.01) |
| *B01D 46/24* | (2006.01) |

(52) U.S. Cl.
CPC ......... *B01D 46/0024* (2013.01); *B01D 39/10* (2013.01); *B01D 39/12* (2013.01); *B01D 46/003* (2013.01); *B01D 46/2403* (2013.01); *B01D 2265/06* (2013.01)

(58) Field of Classification Search
None
See application file for complete search history.

(56) References Cited

U.S. PATENT DOCUMENTS

| | | | | |
|---|---|---|---|---|
| 4,124,360 A | * | 11/1978 | Berger, Jr. ........... | B01D 17/045 210/315 |
| 2010/0147153 A1 | * | 6/2010 | Patel .................. | B01D 46/0024 96/190 |
| 2014/0157738 A1 | * | 6/2014 | Eberle ................ | B01D 46/0024 55/482 |
| 2016/0151723 A1 | | 6/2016 | Linares et al. | |
| 2016/0256813 A1 | * | 9/2016 | Dworatzek ........ | B01D 46/2403 |

FOREIGN PATENT DOCUMENTS

EP    1569735 A1    9/2005

* cited by examiner

*Primary Examiner* — T. Bennett McKenzie
*Assistant Examiner* — Phillip Y Shao
(74) *Attorney, Agent, or Firm* — James Hasselbeck

(57) ABSTRACT

A filter insert for installation in a fluid filter has at least one main separator for separating liquid from aerosol. The main separator is supported at a main separator support tube. The filter insert further has at least one post separator for separating liquid from aerosol that is supported at a post separator support tube. The post separator is arranged downstream of the main separator in a flow direction of a fluid to be cleaned. The post separator is arranged concentric to the main separator and is radially spaced by an intermediate space from the main separator. The post separator support tube is configured to add axial elasticity to the support tube.

11 Claims, 7 Drawing Sheets

FILTER INSERT AS WELL AS FLUID FILTER

FIELD OF THE INVENTION

The present invention relates to a coalescence filter having a filter insert and a pressure-resistant housing for receiving the filter insert.

BACKGROUND OF THE INVENTION

Fluid filters serve generally for separating a fluid from certain substances that are contained in the fluid but are unwanted. Thus, fluid filters can be used, for example, for deoiling compressed air in compressed air systems which are supplied through an oil-lubricated connecting element of a power machine, for example, of a compressor or of a vacuum pump. Filter inserts embodied for separating oil from air, so-called air-oil separators, with their own pressure-resistant housing are fluid filter arrangements which are called air-oil separator boxes. Also, such air-oil separators without their own housing can be installable exchangeably, for example, by a flange, in pressure containers of compressors. Another application possibility of air-oil separators is deoiling of crankcase gases of an internal combustion engine.

Air-oil separators function according to the coalescence principle. The at least one hollow cylindrically embodied filter element is configured as an annular coalescer that coalesces the fine oil droplets to larger oil drops that precipitate downwardly due to the force of gravity in the air-oil separator and downstream thereof. The precipitating oil drops are drained off.

The air laden with oil flows through a raw air inlet into the housing in order to subsequently flow through the filter insert, comprising at least one filter element or separating element configured for separating liquid from aerosol, especially oil from raw air, for example, a main separator and a post separator, and to finally exit in the purified state from the housing through the clean air outlet.

Aside from main separator and post separator, the filter insert may additionally comprise a pre-separator. Publication DE 20 2008 005 672 U1 discloses, for example, an air-oil separator that comprises a knitted wire mesh for pre-separation of oil.

SUMMARY OF THE INVENTION

The invention concerns a filter insert, in particular coalescence filter insert, for installation in a fluid filter, the filter insert comprising:
  at least one main separator embodied for separating liquid from aerosol, wherein the main separator is arranged about a main separator support tube embodied for supporting the main separator, and
  at least one post separator embodied for separating liquid from aerosol, wherein the post separator is arranged concentric to the main separator, is radially spaced by an intermediate space from the main separator, is arranged in flow direction of the fluid to be cleaned downstream of the main separator, and is arranged about a post separator support tube embodied for supporting the post separator.

The invention also relates to a fluid filter, in particular a coalescence filter, having a filter insert of the aforementioned kind and a pressure-resistant housing for receiving the filter insert.

In order for the separating element configured for separating liquid from aerosol to be able to withstand the pressure of the fluid flowing through the separating element and to keep its shape, the separating element is arranged about a support tube. This support tube is usually formed of a perforated sheet metal that comprises air passages or of an expanded metal comprising air passages. For providing the support tube, the perforated sheet metal or the expanded metal is bent to a tube, wherein the radial ends of the tubularly bent perforated sheet metal or expanded metal are joined by a seam, for example, by a fold seam.

The end faces of the substantially hollow cylindrical filter insert each are covered by an end disk. In order to prevent static charging of the filter insert, contact springs or small metal contact strips are placed between the metallic support tubes and the metallic end disks during assembly of the filter insert. By means of these contact springs, an electrical contact between these metallic elements is produced so that static charging can be dissipated through this contact (WO 2004 009 215 A1).

The relatively small diameter of the air passages of the support tubes formed of perforated sheet metal or of expanded metal has the disadvantage that increased flow velocities of the air passing through exist, concentrated locally at the individual air passages. Very minimal flow velocities are found around the air passages. The separated oil drains as a film along the support element. When an oil drop passes by an air passage of the support tube, this drop, due to the high flow velocity of the air passing through, may be entrained by the air stream and reintroduced into the air stream. This reintroduction of already separated substances into the purified fluid stream is referred to as reentrainment.

The invention has the object to further develop a filter insert of the aforementioned kind as well as a fluid filter of the aforementioned kind in such a way that it is of a particularly simple configuration, particularly easy to mount, and still provides a high functionality. In particular,
  a reentrainment of already separated substances into the fluid stream which is passing through the filter insert and
  static charging of the main separator support tube and of the post separator support tube
should be prevented.

This object is solved in accordance with the invention in that the filter insert comprises a post separator support tube comprising axial elasticity.

This object is solved in accordance with the invention in that the fluid filter comprises the filter insert with the post separator support tube comprising axial elasticity and comprises a pressure-resistant housing for receiving the filter insert.

Advantageous embodiments and expedient further developments of the present invention are characterized in the respective dependent claims.

In principle, the invention is based on the post separator support tube comprising an axial elasticity, in particular an axial expansibility, for example, an axial compressibility or an axial stretchability, for example, an axial spring action. The length of the post separator support tube is thus changeable by force action. When the acting force is canceled, the post separator support tube returns to its original length. This axial elasticity enables a length compensation of the post separator support tube.

In this context, expansion means a relative length change of the post separator support tube by application of at least one force. By means of the technique of compression, the post separator support tube is shortened due to the application of pressure forces. By means of the technique of stretching, the post separator support tube is elongated by application of tensile forces. This relative length change can be realized in the cold, for example, at room temperature.

The post separator support tube serves as carrier for a separating medium, namely for the post separator. As a separating medium, the filter insert may comprise, for example, glass fiber paper or nonwoven and/or plastic material nonwovens. The separating media are preferably configured for coalescence separation of liquid, in particular oil, from gas, in particular air.

In order to obtain a multi-stage filtration effect, the filter insert comprises at least two separating media which, in flow direction, are arranged one behind the other, namely a main separator and a post separator. Main separator and post separator can be formed of the same filter material or of different materials.

The respective separating medium is annularly placed about the correlated support tube. For example, the main separator can be annularly wound multiple times about the main separator support tube and the post separator, for example, can be arranged in one layer or several layers about the post separator support tube.

The axial elasticity of the post separator support tube can be used in order to produce an electrical contact between the post separator support tube and further components of the filter insert. The post separator support tube, due to its axial elasticity, can interact with at least one further component of the filter insert such that an electrostatic dissipation is provided.

For example, in an advantageous embodiment of the present invention, an electrical contact between the post separator support tube and at least one further electrically conductive component of the filter insert, for example, between the post separator support tube and
   at least one end disk of the filter insert and/or
   the main separator support tube,
is produced by means of an axial elastic deformation of the post separator support tube. This electrical contact prevents static charging of the filter insert. In this advantageous embodiment of the invention, a direct contact between the post separator support tube and an end disk and/or between the post separator support tube and the main separator support tube can be provided without additional elements. In contrast to the present invention, additional metal contact strips must be employed in the prior art WO 2004 009 215 A1 for providing an electrical contact of these components.

The axial elastic deformation of the post separator support tube can be realized, for example, by means of the technique of expansion, in particular by means of the technique of compression or by means of the technique of stretching.

Advantageously, the axial elasticity of the post separator support tube is configured such that at least a terminal region of the post separator support tube can be everted. In this way, the axial elastic deformation of the post separator support tube can be realized, for example, by everting at least one terminal region of the post separator support tube.

In this context, by means of axial compression or axial stretching at least one terminal region of the post separator support tube can be everted such toward the main separator that the everted region is in direct contact with the main separator support tube.

Alternatively, the everted terminal region can be clamped radially in such a way between an end disk that is embodied for covering an end face of the hollow cylindrical filter insert and the post separator that the everted terminal region is in direct contact with the end disk neighboring the everted terminal region. In this way, a reliable contact relative to this end disk is provided by means of everting.

The everted terminal region of the post separator support tube can be everted such toward the main separator or away from the main separator that this everted terminal region is of a two-layer configuration.

In an advantageous embodiment of the invention, the main separator support tube defines the axial spacing of the end disks.

The filter insert is preferably substantially embodied to be hollow cylindrical. The respective end face of the filter insert is advantageously covered by an end disk. Preferably, an open end disk that has a central flow opening and a closed end disk that completely closes off the filter insert axially are provided, respectively. For securing the post separator support tube in the filter insert, the post separator support tube can be elastically clamped between the two end disks which are arranged at the axial ends of the filter insert.

In order to ensure contact of the post separator support tube at the two end disks, the post separator support tube clamped between the two end disks is advantageously configured with oversize. Preferably, the support tube of the main separator in this context is rigid, i.e., formed of a rigid perforated sheet metal or expanded metal. The expansibility in axial direction of the post separator support tube enables thus a tolerance compensation when mounting both support tubes between two end disks and good electrical contacting between the support tubes and the two end disks. It is preferred that the post separator support tube is embodied with oversize and, axially elastically compressed to an axial length that is reduced relative to the non-clamped state, is elastically secured by clamping between the end disks. In an advantageous embodiment of the present invention, longitudinal slots are arranged at least in one region of the post separator support tube about its entire circumference for providing the axial elasticity of the post separator support tube. This post separator support tube comprising longitudinal slots can be formed, for example, of a perforated sheet metal provided with air passages or of expanded metal provided with air passages.

In an alternative advantageous embodiment of the present invention, for providing the axial elasticity of the post separator support tube the latter is configured as a telescoping structure element. This telescoping structure element comprises at least two tubular elements or cylinder elements, which can be pushed into each other, and thus is able to telescope. The tubular elements or cylinder elements which can be pushed into each other can be formed, for example, of a perforated sheet metal provided with air passages or an expanded metal provided with air passages. Preferably, at least one of the tubular elements or cylinder elements that can be pushed into each other is spring-loaded.

Alternatively, the post separator support tube can be a tubularly formed perforated sheet metal or a tubularly formed expanded metal that for providing the axial elasticity of the post separator support tube comprises at least one spiral-type cut. This spiral-type cut is preferably arranged at least at one axial terminal region of the post separator support tube.

Alternatively, the post separator support tube can be embodied as an axially elastic spiral spring element or coil spring element. In order to provide a particularly strong support action for the post separator, this axially elastic spiral spring element is preferably wound almost to a block form.

Alternatively, the post separator support tube can be a tubular knitted wire mesh. In this embodiment, the axial elasticity of the post separator support tube is provided by the intermeshing action of the individual meshes of the knitted wire mesh. Since the individual loops are slidable relative to each other, the knitted wire mesh exhibits a spring action which enables a length compensation of the post separator support tube.

The tubular knitted wire mesh is advantageously knitted circularly, for example, by means of a circular knitting machine. This has the advantage that the post separator support tube is configured without seam or without fold.

In a particularly advantageous embodiment, the support element for the post separator is thus a knitted wire mesh which is knitted to the corresponding diameter, in particular knitted circularly.

Due to the structure of a knitted wire mesh, the reintroduction of already separated oil into the air stream, the so-called reentrainment, is reduced in comparison to a perforated sheet metal or an expanded metal. One reason for this is that a knitted wire mesh has a greater open surface area and thus produces a reduced flow resistance for the air passing through. Due to the greater open surface area of the knitted wire mesh, the flow velocity of the air passing through is reduced compared to a perforated sheet metal so that less oil is entrained by the air stream and reentrainment is reduced. The reduced flow resistance of the knitted wire mesh thus provides a reduction of the residual oil contents.

In comparison to the perforated sheet metal or the expanded metal, reintroduction of already separated oil into the air stream in case of knitted wire mesh is also reduced due to the fact that the knitted wire mesh has no sharp edges.

Also, a knitted wire mesh assists in oil separation because the individual wires act like over-dimensioned fibers where the oil adheres and where it runs down following the force of gravity.

The filter insert is advantageously exchangeably installable in a pressure container of a compressed air compressor and forms with the latter a fluid filter. Alternatively, the filter insert is arranged in a spin-on housing for forming a so-called air-oil separator box which is configured as a type of exchangeable disposable filter. The filter insert is advantageously configured for separating oil from raw air, originating from a connecting component of a power machine, in particular from a compressor or from a vacuum pump, as well as for supplying the purified clean air as well as the separated oil to the connecting component of the power machine.

BRIEF DESCRIPTION OF THE DRAWINGS

As already explained above, there are various possibilities to embody and further develop the teachings of the present invention in advantageous ways. In this context, on the one hand, reference is being had to the dependent claims; on the other hand, further embodiments, features, and advantages of the present invention will be explained in the following in more detail inter alia with the aid of the embodiments illustrated in FIGS. 1 through 7.

Same or similar configurations, elements or features are provided in the FIGS. 1 through 7 with identical reference characters.

DESCRIPTION OF PREFERRED EMBODIMENTS

Figure 1:
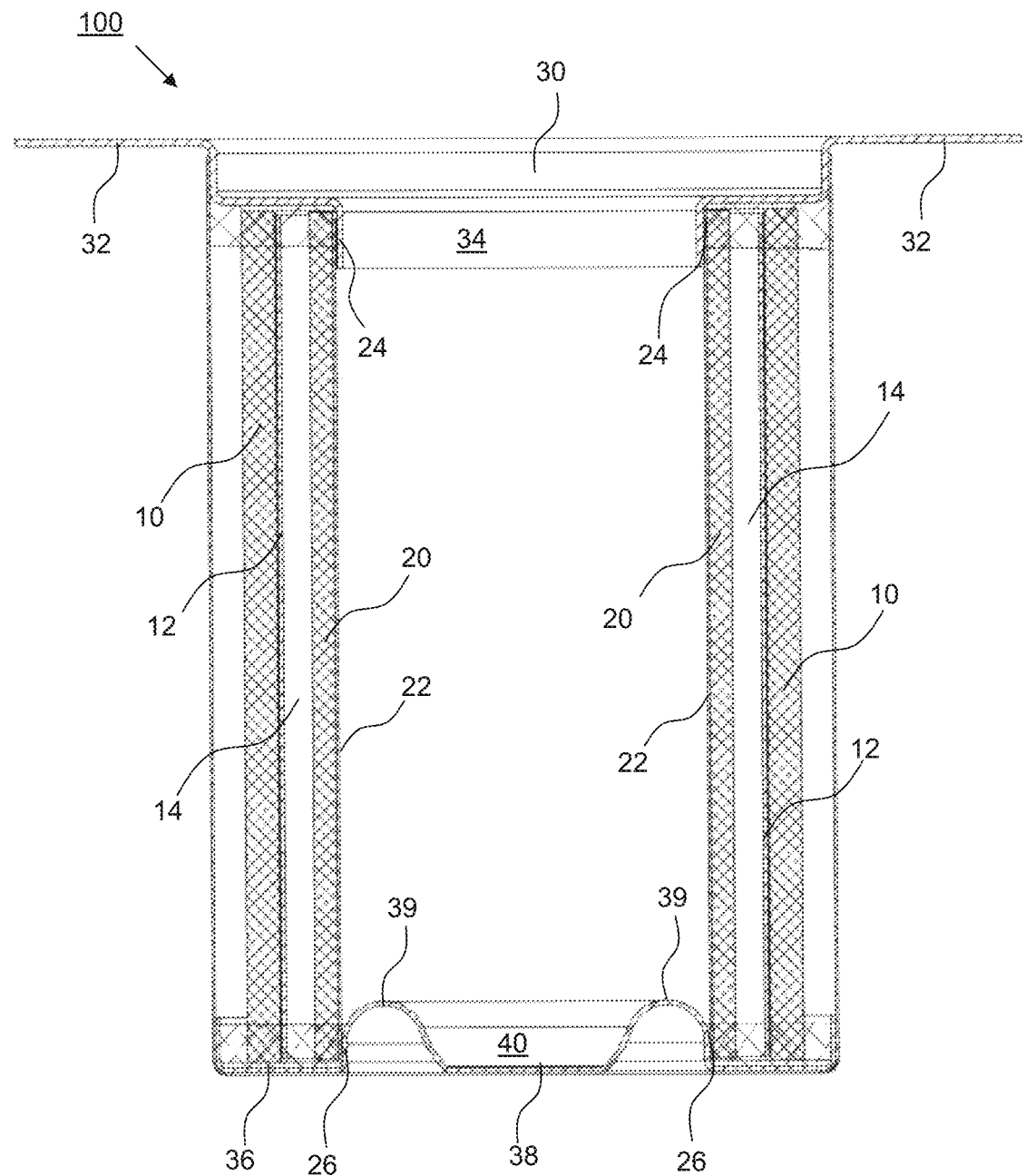
FIG. 1 shows in schematic section illustration a first embodiment of a filter insert according to the present invention.
Figure 2:
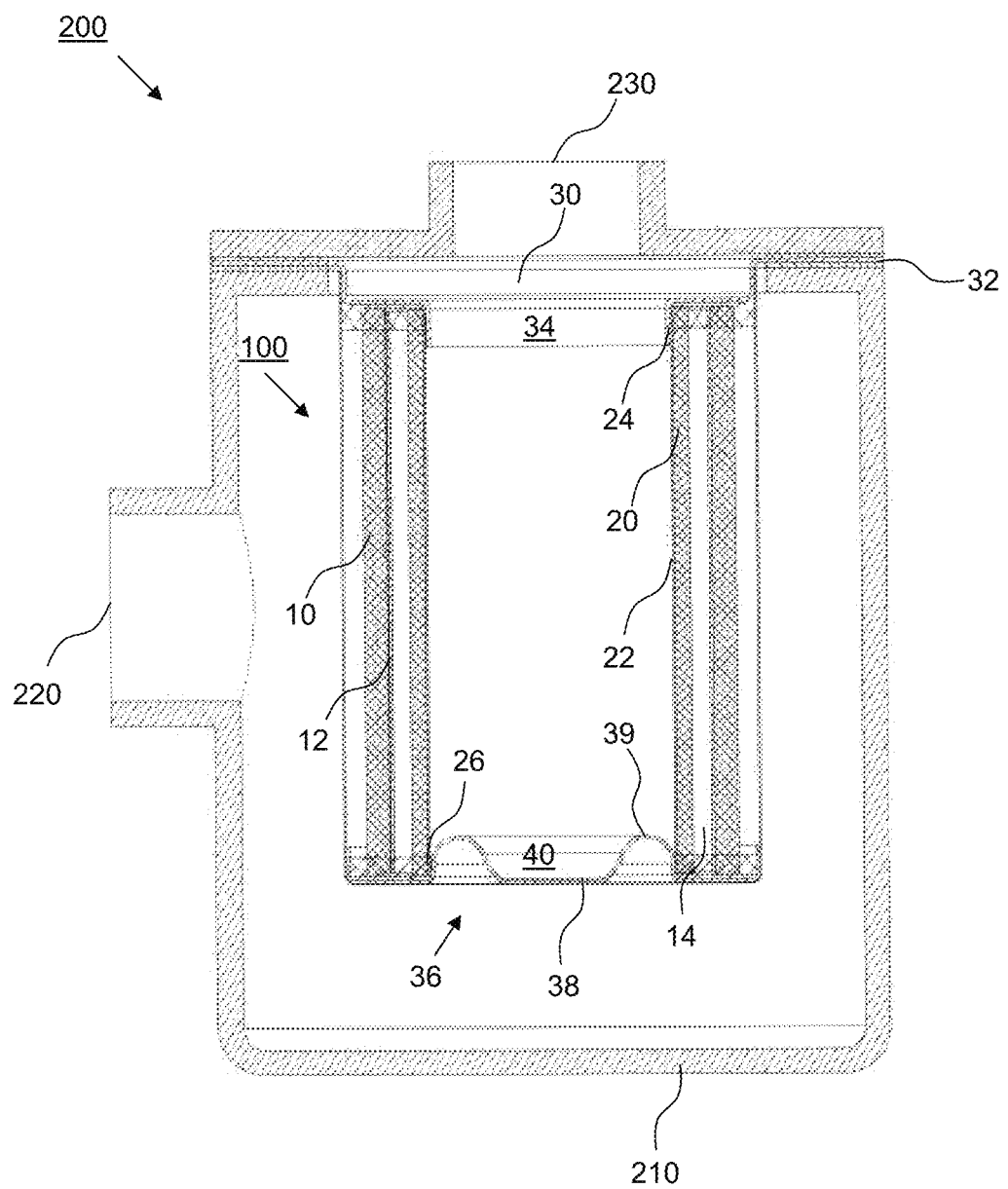
FIG. 2 shows in schematic section illustration an embodiment of a fluid filter element according to the present invention with the filter insert of FIG. 1.
Figure 3:
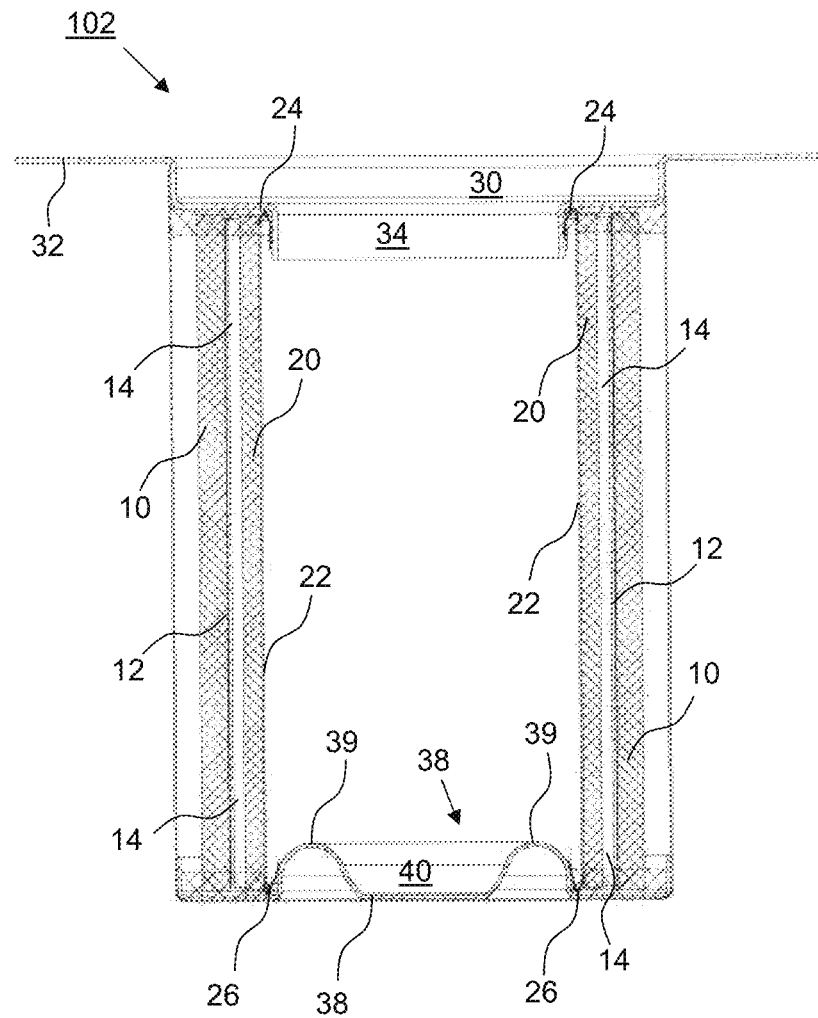
FIG. 3 shows in schematic section illustration a second embodiment of a filter insert according to the present invention wherein the terminal regions of the post separator support tube are everted in radial direction inwardly.
Figure 4:
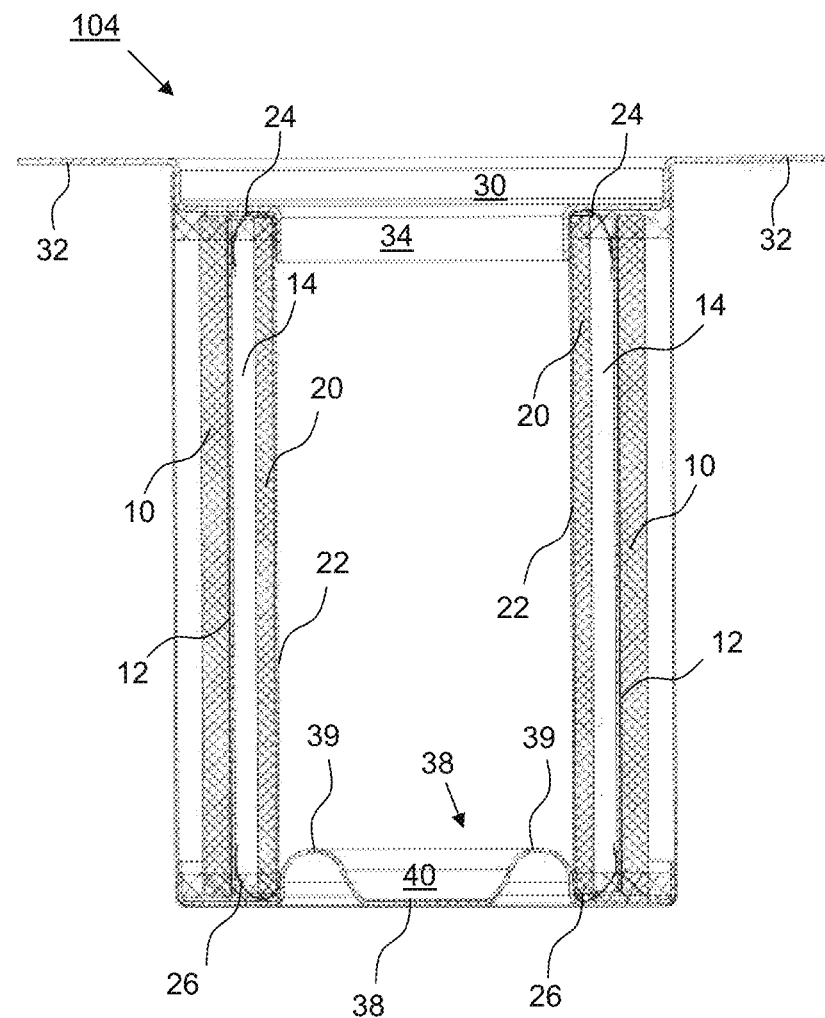
FIG. 4 shows in schematic section illustration a third embodiment of a filter insert according to the present invention, wherein the terminal regions of the post separator support tube are everted toward the main separator.
Figure 5:
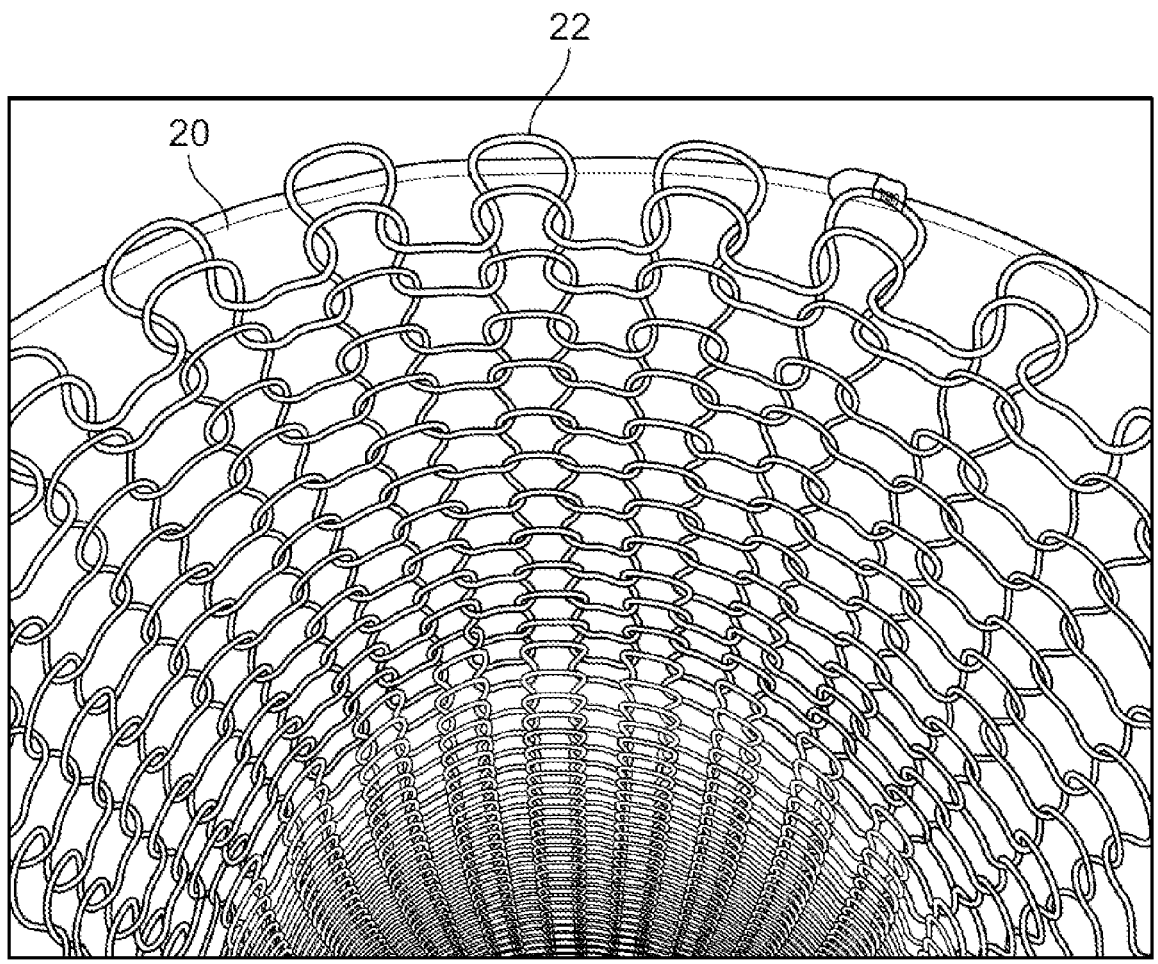
FIG. 5 shows in detail view the post separator support tube of the filter insert of FIG. 3 prior to everting the terminal regions.
Figure 6:
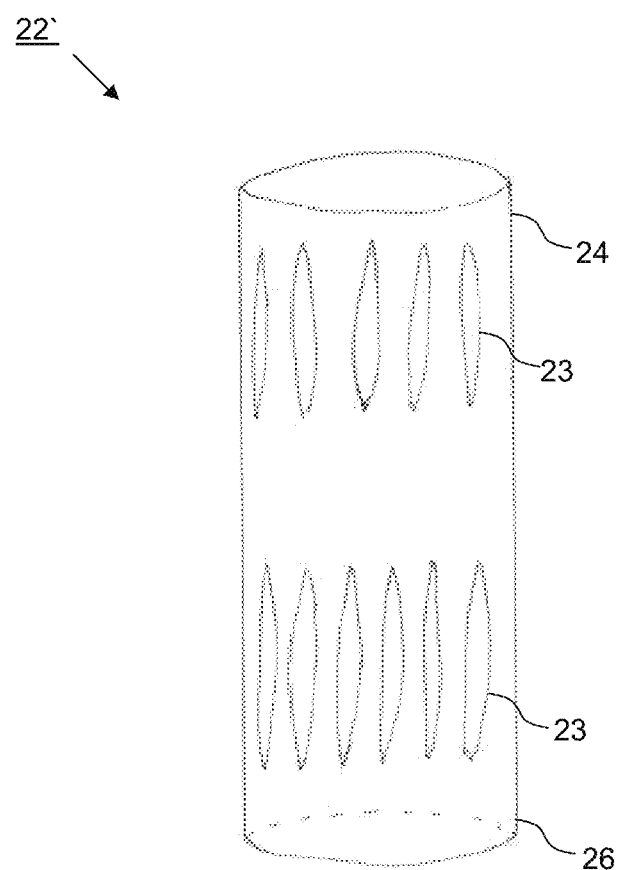
FIG. 6 shows in schematic illustration a fourth embodiment of a post separator support tube embodied for a filter insert according to the present invention, namely a post separator support tube with circumferentially extending longitudinal slots.
Figure 7:
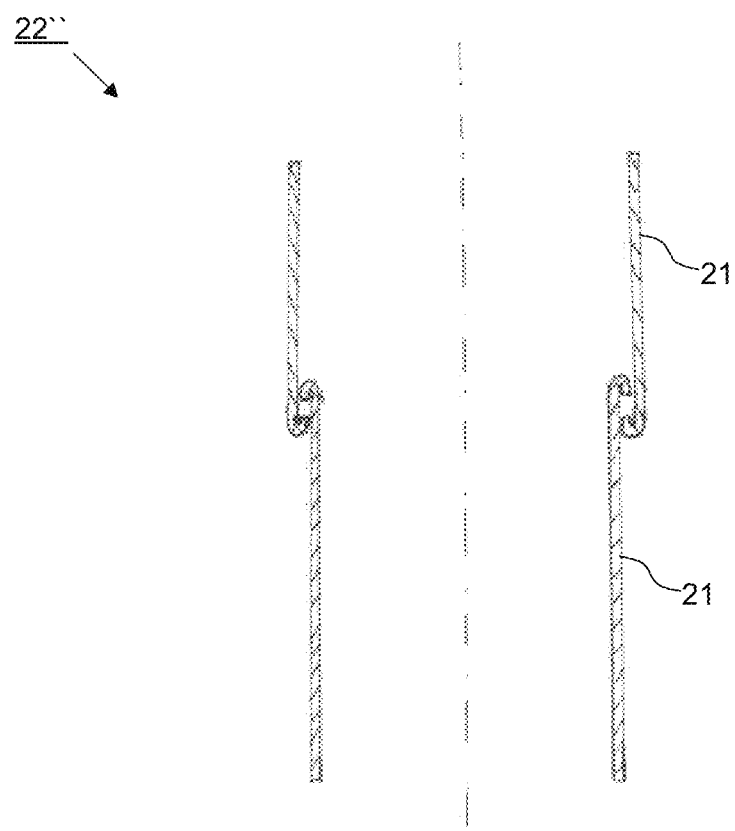
FIG. 7 shows in schematic section illustration a fifth embodiment of a post separator support tube embodied for a filter insert according to the present invention, namely a telescoping post separator support tube.

For avoiding unnecessary repetitions, the following explanations with regard to configurations, features, and advantages of the present invention (inasmuch as not mentioned otherwise) apply to the first embodiment of a filter insert 100 according to the present invention illustrated in FIGS. 1, 2 and 5, as well as to the second embodiment of a filter insert 102 according to the present invention illustrated in FIG. 3, as well as to the third embodiment of a filter insert 104 according to the present invention illustrated in FIG. 4, as well as to a filter insert which comprises the post separator support tube 22' illustrated in FIG. 6, as well as to a filter insert which comprises the post separator support tube 22" illustrated in FIG. 7.

FIG. 2 shows a first embodiment of a filter insert 100, wherein this filter insert 100 is installed in a pressure container 200. This pressure container 200 comprises a pressure-resistant housing 210 with a raw air inlet 220 for inflow of the air-oil mixture and a clean air outlet 230 for outflow of the purified air. Deoiling of the air is achieved in that the air-oil mixture in the form of a mist flows through at least two separate filter media, namely a main separator 10 and a downstream post separator 20. In the illustrated embodiments, the main separator 10 is radially outwardly arranged and the post separator 20 radially inwardly in cross-section of the filter insert 100, 102, and 104. In addition, a pre-separator can be arranged in flow direction of the fluid upstream of the main separator 10. The main separator 10 and the post separator 20 each are embodied as an annular coalescer.

The main separator 10 is a fine pore nonwoven which is wound several times about a main separator support tube 12 embodied for supporting the main separator 10. The main separator support tube 12 supports the differential pressure which is generated across the separating medium of the main separator.

The main separator support tube 12 is the length-determining dimension of the filter insert 100. In this context, the main separator support tube 12 determines the spacing between two end disks 30, 36 which are provided for covering the end faces of the hollow cylindrical filter insert. Stated more precisely, the main separator support tube 12 determines the spacing between a radially extending flange 32 of the first end disk 30 embodied for arranging the filter insert 100, 102, 104 in the pressure-resistant housing 210, and the radially extending bottom 38 of second end disk 36.

The end disks 30, 36 are connected to the main separator 10 and the post separator 20, for example, by means of adhesive.

The actual separation is realized in the main separator 10. Depending on the flow velocity and depending on how the main separator 10 is configured, the air stream that passes through the element may entrain already separated drops. The latter are caught in the post separator 20 and flow, following the force of gravity, in the direction of the bottom 38 of the filter insert 100, 102, 104. In this context, the drops run either within the post separator 20 in downward direction or, when the air stream forces them so far through the post separator 20 that they come into contact with the post separator support tube 22, the drops deposit on the post separator support tube 22 and run along the post separator support tube 22 in downward direction. The oil is thus running downwardly along the radial inner surface of the post separator support tube 22. Inasmuch as the post separator support tube 22, as illustrated in FIG. 5, is configured as a knitted wire mesh 22, the oil will find its way along the wires of the knitted wire mesh 22.

The post separator 20 is arranged concentric to the main separator 10. The post separator 20 is configured such that the fluid when flowing through the post separator 20 generates a reduced differential pressure compared to when passing through the main separator 10. For example, the post separator 20 can have a more open-pored configuration in comparison to the main separator 10. Preferably, the post separator 20 is formed of a single-layer nonwoven that has a relatively open-pored configuration.

A post separator support tube 22 supports the post separator nonwoven 20. The main function of the post separator support tube 22 is supporting the post separator 20. In addition, the post separator support tube 22 can assist in transporting away the oil which has been separated in the post separator.

According to the invention, the post separator support tube 22; 22'; 22" exhibits axial elasticity. The post separator support tube 22; 22'; 22" illustrated in the FIGS. 1 and 2 can be, for example,

- a telescoping structure element with two cylinders (compare FIG. 7) wherein one of the cylinders can be spring-loaded, or
- a tubularly formed perforated sheet metal or a tubularly formed expanded metal that, distributed about its circumference, comprises longitudinal slots 23 (compare FIG. 6) or a tubularly formed perforated sheet metal or a tubularly expanded metal that comprises at least at one axial terminal region a spiral-type cut, or
- an axially elastic spiral spring element, or
- a tubular knitted wire mesh.

In the filter insert illustrated in FIGS. 3 and 4, the support tube 22 for the post separator 20 is made of circularly knitted wire. FIG. 5 shows a detail view of such a knitted wire mesh 22. The knitted wire mesh 22 that is knitted as a tube is flexible due to the structure of the knitted material in longitudinal direction because the individual meshes can slide within each other.

The post separator nonwoven 20 is applied to the knitted wire mesh 22, either prior to or during mounting of the filter insert into the pressure container 200. In this context, the post separator nonwoven 20 can be wound, for example, as a single layer onto the knitted wire mesh 22 or can be sewn fixedly to the knitted wire mesh 22. The post separator nonwoven 20, for example, can be a polyester nonwoven which is formed as an endless hose and, for example, has a diameter between approximately 5 millimeters and approximately 50 millimeters. Such a post separator configured as an endless hose can be pulled simply onto the post separator support tube 22 during assembly.

The end disks 30, 36 are made of electrically conductive material, in particular of metal. In order to prevent static charging, the post separator support tube 22 is in direct contact with the two end disks 30, 36.

The first end disk 30 comprises radially inwardly a circumferentially extending collar 34 which extends in axial direction toward the interior of the filter insert 100. In FIG. 1, the post separator support tube 22 is in direct contact with the collar 34 of the first end disk 30. In order to secure this contact, the collar 34 of the first end disk 30 can comprise a circumferentially extending radial groove (not illustrated). Advantageously, the knitted wire mesh 22 has a somewhat smaller diameter compared to the collar 34, for example, compared to the groove of the collar 34. In this way, by slight expansion or slight compression, the knitted wire mesh 22 can be clamped by the collar 34, for example, by the groove of the collar 34, and good electrical contact between the knitted wire mesh 22 and the collar 34 can be provided.

The second end disk 36 is configured as a bottom element and covers the entire terminal surface area of the filter insert 100. The bottom element comprises a depression 39 adjacent to the post separator support tube 22 which is circumferentially extending and extends in axial direction toward the interior of the filter insert 100 and is, for example, U-shaped or semicircular or cup-shaped. This circumferentially extending depression 39 delimits a collecting chamber 40 for the separated fluid, in particular for the separated oil. The fluid collected in the collecting chamber 40 can be drained, for example, by means of a drainage pipe, not illustrated.

The post separator support tube 22, as illustrated in FIG. 1, is advantageously in direct contact with the side of the axial depression 39 of the second end disk 36 which is facing the post separator support tube 22. In order to ensure this contact, the depression 39 of the second end disk 36 may comprise a radially extending circumferential groove (not illustrated).

By means of everting, the spring action of the knitted wire mesh 22 can be reinforced because the knitted wire mesh 22 has the tendency to re-evert and push in the direction opposite to the everting direction. In this way, the electrical contact of the post separator support tube 22 with the first end disk 30 or with the second end disk 36 or with the main separator support tube 12 can be supported. Everting in this context is to be understood in that at least one terminal region 24, 26 of the post separator support tube 22 is folded inwardly (compare FIG. 3) or outwardly (compare FIG. 4) so that this folded terminal region is of a two-layer configuration.

Accordingly, as illustrated in FIG. 3, for ensuring the contact between the post separator support tube 22 and
the collar 34 of the first end disk 30 and/or
the depression 39 of the second end disk 36
a terminal region 24, 26 of the knitted wire mesh 22 can be everted toward the collar 34 of the first end disk 30 or toward the depression 39 of the second end disk 36.

Alternatively, as illustrated in FIG. 4, for ensuring the contact between the post separator support tube 22 and the main separator support tube 12 at least one terminal region 24, 26 of the knitted wire mesh 22 can be everted toward the main separator support tube 12. By everting the knitted wire mesh 22, an electrical connection to the main separator support tube 12, for example, radially outwardly arranged, can be produced. In this context, the knitted wire mesh 22 can be everted outwardly so far that the everted rim has contact with the main separator support tube 12.

In the fourth embodiment of a post separator support tube 22' illustrated in FIG. 6, the post separator support tube 22' comprises longitudinal slots 23 distributed about its circumference and can thus be compressed in case of axial loading whereby the post separator support tube 22' will widen. In the embodiment illustrated in FIG. 6, the longitudinal slots 23 are substantially distributed about the entire body of the post separator support tube 22'. Alternatively, the longitudinal slots 23 can be arranged only at the first or top terminal region 24 and/or at the second or bottom terminal region 26 of the post separator support tube 22'. Upon axial loading, the tube 22' mushrooms in the region of the longitudinal slots 23 and is thus compressed axially.

In the fifth embodiment illustrated in FIG. 7, the post separator support tube 22' is comprised of two tubular elements 21 pushed into each other and is thus able to telescope.

Manufacture of the post separator support tube 22 with an axial elasticity has the advantage that the post separator support tube 22; 22'; 22" can be elastically clamped between the two end disks 30, 36 of the filter insert 100; 102; 104.

By everting at least one terminal region of the post separator support tube 22, an electrical contact relative to at least one further component of the filter insert 100, 102, 104 can be provided. For example, by everting at least one terminal region of the post separator support tube 22 an electrical contact to the main separator support tube 12 can be produced so that the contact springs, which are employed for this purpose in the prior art, are obsolete.

The configuration of the support tube 22 for the post separator 20 of a tubular knitted wire mesh has further advantages. On the one hand, a knitted wire mesh due to its significantly larger open surface area in comparison to a perforated sheet metal or an expanded metal generates a reduced flow resistance for the fluid flowing through. On the other hand, the structure of the knitted wire mesh reduces reentrainment of previously already separated oil into the air stream. This has a great influence on the residual oil contents of the purified compressed air. Finally, the use of a knitted wire mesh as a post separator support tube 22 instead of a perforated sheet metal or of an expanded metal provides a cost advantage, in particular for small air-oil separators whose post separator support tube, for example, has a diameter of approximately 5 millimeters to approximately 50 millimeters.

LIST OF REFERENCE CHARACTERS

10 main separator
12 main separator support tube, in particular main separator metal support grid, for example strong central tube
14 intermediate space between main separator 10 and post separator 20
20 post separator, in particular post separator nonwoven
21 tubular element or cylinder element of the post separator support tube 22" embodied as a telescoping structure element (fifth embodiment, compare FIG. 7)
22 post separator support tube, in particular tubular knitted wire mesh or knitted wire mesh tube (first to third embodiment, compare FIGS. 3 to 5) or axially elastic spiral spring element
22' post separator support tube, in particular post separator support tube with circumferentially distributed longitudinal slots (fourth embodiment, compare FIG. 6)
22" post separator support tube, in particular telescoping structure element (fifth embodiment, compare FIG. 7)
23 longitudinal slots of the post separator support tube 22' (fourth embodiment, compare FIG. 6)
24 first terminal region of the post separator support tube 22, 22', in particular end face terminal region of the post separator support tube 22', 22', for example, first collar of the post separator support tube 22, 22'
26 second terminal region or second collar of the post separator support tube 22, 22', in particular bottom-side terminal region of the post separator support tube 22, 22', for example, second collar of the post separator support tube 22, 22'
30 first end disk or first end cap or cover for covering the hollow cylindrical end face of the filter insert, in particular end face end disk
32 flange of the first end disk 30
34 collar of the first end disk 30
36 second end disk or second end cap or bottom element for covering the hollow cylindrical bottom side of the filter insert 100, in particular bottom side end disk, in particular closed end disk
38 bottom of the second end disk 36
39 axial depression of the second end disk 36, in particular recessed portion of the second end disk 36 that in cross section is U-shaped or semicircular and in plan view is circular or annular, for example, cup of the axial end disk 36
40 collecting chamber for the separated fluid
100 filter insert, in particular air-oil separator, first embodiment, compare FIGS. 1, 2 and 5
102 filter insert, in particular air-oil separator, second embodiment, compare FIG. 3
104 filter insert, in particular air-oil separator, third embodiment, compare FIG. 4
200 pressure container for receiving a filter insert, in particular a coalescence filter insert or an air-oil separator for separating oil from raw air, for example, air-oil separator box
210 pressure-resistant housing of the pressure container 200
220 raw fluid inlet for letting in the fluid to be cleaned, in particular raw air inlet
230 clean fluid outlet for letting out the cleaned fluid, in particular clean air outlet

What is claimed is:
1. A filter insert for installation in a fluid filter, the filter insert comprising:
at least one main separator configured to separate liquid from aerosol;
a main separator support tube,
wherein the at least one main separator is arranged about the main separator support tube and the main separator support tube supports the at least one main separator;
at least one post separator configured to separate liquid from aerosol;
a post separator support tube,
wherein the at least one post separator is arranged about the post separator support tube and the post separator support tube supports the at least one post separator;
wherein the at least one post separator is arranged downstream of the at least one main separator in a flow direction of a fluid to be cleaned;

wherein the at least one post separator is arranged concentric to the at least one main separator and is radially spaced by an intermediate space from the at least one main separator;

wherein the post separator support tube comprises axial elasticity;

wherein the filter insert is substantially hollow cylindrical and comprises
a first axial end face; and
a second axial end face;

wherein the filter insert comprises
a first end disk covering the first axial end face; and
a second end disk covering the second axial end face;

wherein the main separator support tube is rigid and defines an axial spacing distance from the first to the second end disk;

wherein the post separator support tube is elastically clamped between the first and second end disks;

wherein the post separator support tube is axially oversize and wherein, in an unclamped state, has an uncompressed axial length that is greater than the defined axial spacing distance;

wherein the post separator support tube, when clamped between the filter element end disks, is axially compressed to a reduced axial length relative to the uncompressed axial length of the post separator support tube;

wherein the post separator support tube is elastically secured by the clamping between the end disks;

wherein at least one terminal region of the post separator support tube is everted and forms an everted terminal region, wherein the everted terminal region is clamped radially between the first or second end disk covering one of the end faces of the filter insert and the post separator such that the everted terminal region is in direct contact with the end disk neighboring the everted terminal region.

2. The filter insert according to claim 1, wherein the first end disk is open and the second end disk is closed.

3. The filter insert according to claim 1, wherein,
by an axial elastic deformation of the post separator support tube, an electrical contact between the post separator support tube and at least one component of electrically conductive material of the filter insert is produced.

4. The filter insert according to claim 3, wherein at least one terminal region of the post separator support tube undergoes the axial elastic deformation.

5. The filter insert according to claim 3,
wherein the electrical contact by the axial elastic deformation of the post separator support tube is produced between the post separator support tube and
at least one end disk of the filter insert covering one of the end faces of the filter insert and/or
the main separator support tube.

6. The filter insert according to claim 3, wherein the axial elastic deformation of the post separator support tube is realized by expansion, compression or stretching.

7. The filter insert according to claim 1, wherein the post separator support tube is a tubular knitted wire mesh.

8. The filter insert according to claim 7, wherein the tubular knitted wire mesh is circularly knitted.

9. The fluid insert according to claim 1, wherein the filter insert is a coalescence filter insert.

10. A fluid filter comprising:
the filter insert according to claim 1; and
a pressure-resistant housing configured to receive the filter insert.

11. The fluid filter according to claim 10, wherein the filter insert is a coalescence filter insert.

* * * * *